US011877670B2

(12) United States Patent
Takeuchi et al.

(10) Patent No.: US 11,877,670 B2
(45) Date of Patent: Jan. 23, 2024

(54) LOWER BODY SUPPORT SYSTEM TO FACILITATE FLOOR LEVEL TASK EXECUTION BY HUMANS

(71) Applicants: Empower Robotics Corporation, Lexington, MA (US); Sumitomo Heavy Industries, Ltd., Tokyo (JP)

(72) Inventors: Kosuke Takeuchi, Waltham, MA (US); Kazumasa Shudo, Kanagawa (JP); Juyoung Kim, Newton, MA (US); Sheng Liu, Cambridge, MA (US); Haruhiko Harry Asada, Lincoln, MA (US)

(73) Assignees: Empower Robotics Corporation, Lexington, MA (US); Sumitomo Heavy Industries, Ltd., Tokyo (JP)

( * ) Notice: Subject to any disclaimer, the term of this patent is extended or adjusted under 35 U.S.C. 154(b) by 753 days.

(21) Appl. No.: 16/938,839

(22) Filed: Jul. 24, 2020

(65) Prior Publication Data

US 2021/0022513 A1 Jan. 28, 2021

Related U.S. Application Data

(60) Provisional application No. 62/879,247, filed on Jul. 26, 2019.

(51) Int. Cl.
*A47C 9/02* (2006.01)
*A61H 1/02* (2006.01)
(Continued)

(52) U.S. Cl.
CPC ................ *A47C 9/027* (2013.01); *A45B 5/00* (2013.01); *A47C 9/10* (2013.01); *A61H 1/0237* (2013.01);
(Continued)

(58) Field of Classification Search
CPC .. A47C 9/10; A47C 9/027; A45B 5/00; A61H 2201/1633; A61H 2203/0418
(Continued)

(56) References Cited

U.S. PATENT DOCUMENTS 406,328 A * 7/1889 Yagn ...................... A63B 25/10 482/77
671,638 A * 4/1901 Slagle ...................... A47C 9/10 297/4

(Continued)

FOREIGN PATENT DOCUMENTS

| | | |
|---|---|---|
| JP | 2002-125789 | 5/2002 |
| JP | 2016-034461 | 3/2016 |
| JP | 2020-192040 | 12/2020 |

OTHER PUBLICATIONS 9 page PDF of the Written Opinion dated Oct. 9, 2020 in PCT/US2020/043617. (Year: 2020).*

(Continued)

*Primary Examiner* — Robert Canfield
(74) *Attorney, Agent, or Firm* — IPUSA, PLLC

(57) ABSTRACT

Wearable systems to partially support the weight of a human user engaged in task performance in a crouched position at or near ground level are presented herein. In one aspect, the wearable systems employ passive mechanisms and the configuration of the support mechanisms is changed by movements of the body of the human user while transitioning from a standing position to a crouched position, and vice-versa. In a further aspect, each passive lower body support assembly includes an auxiliary body support structure to enhance the support of the human user in a crouched position. In another further aspect, each auxiliary body support structure is deployed in coordination with the movement of the seat support structure that supports the human user. In some embodiments, one or more body support (Continued)

structures are constructed from an elastic material that conforms to the ground surface when loaded by the weight of the human user.

20 Claims, 9 Drawing Sheets

(51) Int. Cl.
*A47C 9/10* (2006.01)
*A45B 5/00* (2006.01)

(52) U.S. Cl.
CPC ................ *A61H 2201/1253* (2013.01); *A61H 2201/1633* (2013.01); *A61H 2201/1652* (2013.01); *A61H 2203/0418* (2013.01)

(58) Field of Classification Search
USPC .............................................................. 297/4
See application file for complete search history.

(56) References Cited

U.S. PATENT DOCUMENTS

| | | | | | |
|---|---|---|---|---|---|
| 690,122 | A * | 12/1901 | Slagle | A45B 5/00<br>297/4 |
| 1,220,316 | A * | 3/1917 | Bragg | A47C 9/04<br>297/4 |
| 1,417,250 | A * | 5/1922 | Kelly | A61F 5/02<br>135/65 |
| 1,709,200 | A * | 4/1929 | Westbrook | A47C 9/04<br>297/4 |
| 2,099,345 | A * | 11/1937 | Olszanowski | A47C 9/10<br>297/4 |
| 4,095,842 | A * | 6/1978 | Tretick | A47C 9/027<br>297/4 |
| 4,138,156 | A * | 2/1979 | Bonner | A47C 9/10<br>297/DIG. 10 |
| 7,980,625 | B2 * | 7/2011 | Worthington | A47C 16/00<br>248/397 |
| 10,537,459 | B2 * | 1/2020 | Gunura | A47C 9/025 |
| 2006/0102423 | A1 | 5/2006 | Lang et al. | |
| 2011/0040216 | A1 | 2/2011 | Herr et al. | |
| 2013/0130866 | A1 | 5/2013 | Wehrell | |
| 2014/0026893 | A1 | 1/2014 | Johnson et al. | |
| 2015/0119996 | A1 * | 4/2015 | Choi | A61F 5/01<br>623/24 |
| 2016/0135604 | A1 * | 5/2016 | Kim | A47C 9/10<br>297/4 |
| 2016/0331486 | A1 * | 11/2016 | Nakatani | A47C 9/025 |
| 2016/0331623 | A1 * | 11/2016 | Nakatani | A61H 1/0244 |
| 2018/0317662 | A1 * | 11/2018 | Gunura | A47C 9/025 |
| 2019/0015286 | A1 * | 1/2019 | Glaister | A61F 2/604 |
| 2019/0183713 | A1 * | 6/2019 | Sankai | A61B 5/389 |
| 2020/0046132 | A1 * | 2/2020 | Gunura | F16C 1/106 |
| 2020/0155390 | A1 * | 5/2020 | Bae | A47C 9/025 |
| 2020/0206900 | A1 * | 7/2020 | Lee | A61G 5/14 |
| 2020/0315357 | A1 * | 10/2020 | Lim | A47C 9/025 |
| 2021/0007500 | A1 * | 1/2021 | Vafi | A61G 5/14 |
| 2021/0113412 | A1 * | 4/2021 | Holgate | A61H 1/00 |
| 2021/0228431 | A1 * | 7/2021 | Alberti | A61H 1/0244 |
| 2021/0368991 | A1 * | 12/2021 | Bae | A47C 9/025 |

OTHER PUBLICATIONS

International Search Report for PCT/US2020/043617 dated Oct. 9, 2020.

* cited by examiner

LOWER BODY SUPPORT SYSTEM TO FACILITATE FLOOR LEVEL TASK EXECUTION BY HUMANS

CROSS REFERENCE TO RELATED APPLICATIONS

The present application for patent claims priority under 35 U.S.C. § 119 from U.S. provisional patent application Ser. No. 62/879,247, entitled "Support Gear For Floor Level Tasks," filed Jul. 26, 2019, the subject matter of which is incorporated herein by reference in its entirety.

TECHNICAL FIELD

The described embodiments relate to wearable mechanical structures to stably support a human user over a range of mechanical positions.

BACKGROUND INFORMATION

Many labor related activities require workers to perform tasks in ergonomically awkward positions that can be unstable and sometimes unsafe for the workers. In one example, a worker is required to perform tasks at ground level, such as welding or grinding tasks. Typically, this requires a worker to bend forward from a standing position, crouch down and bend forward, or sit down on both knees and bend forward to reach the workpiece. Any of these postures can cause muscle fatigue and often lead to chronic back pain and injuries. For example, a crouching posture is relatively common for workers performing tasks near or at floor level. Observations of factory workers in crouching positions reveals that these workers, as fatiguing as it is, tend to develop muscle memory and skills that makes it difficult for them to change posture. In addition, a worker might use one or both hands to support the body at ground level, which reduces productivity.

Various pads and support structures have been developed in an attempt to ease the strain that may develop while performing tasks at ground level for an extended period of time. One example is the Hyundai Chairless Exoskeleton (H-CEX). The H-CEX is a mechanical support structure designed to relieve stress on the knee of a human user when performing tasks above knee level. The human user fixes the H-CEX to the human body at the waist, thigh and knee using belts. A set of legs deploy like a chair and the human user assumes a seated position. Unfortunately, the supportive legs protrude from the back of each lower leg of the human user. This interferes with movement and easily collides with objects in the surrounding environment. Also, the foot of each supportive leg is small and offers limited weight support. As a result, the human user must support most body weight by muscle exertion, causing fatigue in the hips, thighs, calves, and toes. In addition, each supportive leg is deployed manually. The human user must explicitly deploy each support leg by hand before moving to a seated position. This explicit deployment operation is not desirable as it interrupts work flow. Finally, H-CEX is a seated support structure that is not suitable to support human task performance at or near floor level, such as welding or grinding operations.

In large measure, traditional approaches have not significantly reduced the toll on the human body when performing tasks at ground level. Improvements to support gear available to stably support a human user with minimal intrusion while the human user performs work tasks at or near ground level are desired.

SUMMARY

Wearable systems to partially support the weight of a human user engaged in task performance in a crouched position at or near ground level are presented herein. Supporting the weight of a human user in a crouched position reduces fatigue, discomfort, and injury risk while enhancing task performance.

In one aspect, the wearable systems described herein employ passive mechanisms and the configuration of the support mechanisms is changed by movements of the body of the human user while transitioning from a standing position to a crouched position, and vice-versa.

In a further aspect, each passive lower body support assembly includes an auxiliary body support structure to enhance the support of the human user in a crouched position.

In another further aspect, each auxiliary body support structure is deployed in coordination with the rotation of a seat support structure that rotates from a location behind the seat of human user to a location below the seat of the human user.

In another aspect, each primary body support structure is constructed from an elastic material that conforms to a shape of the ground surface when loaded by the weight of the human user.

In another aspect, each passive lower body support assembly includes an auxiliary body support structure coupled to the primary body support structure at or near an end of the primary body support structure closest to the ground surface of the working environment to enhance the support of the human user in a crouched position.

In another aspect, each passive lower body support assembly includes an auxiliary body support structure coupled to the primary body support structure and constrained to translate with respect to the primary body support structure along a linear joint to enhance the comfort of the human user in a crouched position.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Wearable systems to partially support the weight of a human user engaged in task performance in a crouched position at or near ground level are presented herein. Supporting the weight of a human user in a crouched position reduces fatigue, discomfort, and injury risk while enhancing task performance. The wearable systems described herein may be employed by laborers in many industries, such as food production, equipment assembly, construction, healthcare, etc.

In one aspect, the wearable systems described herein employ passive mechanisms and the configuration of the support mechanisms is changed by movements of the body of the human user while transitioning from a standing position to a crouched position, and vice-versa.

Figure 1:
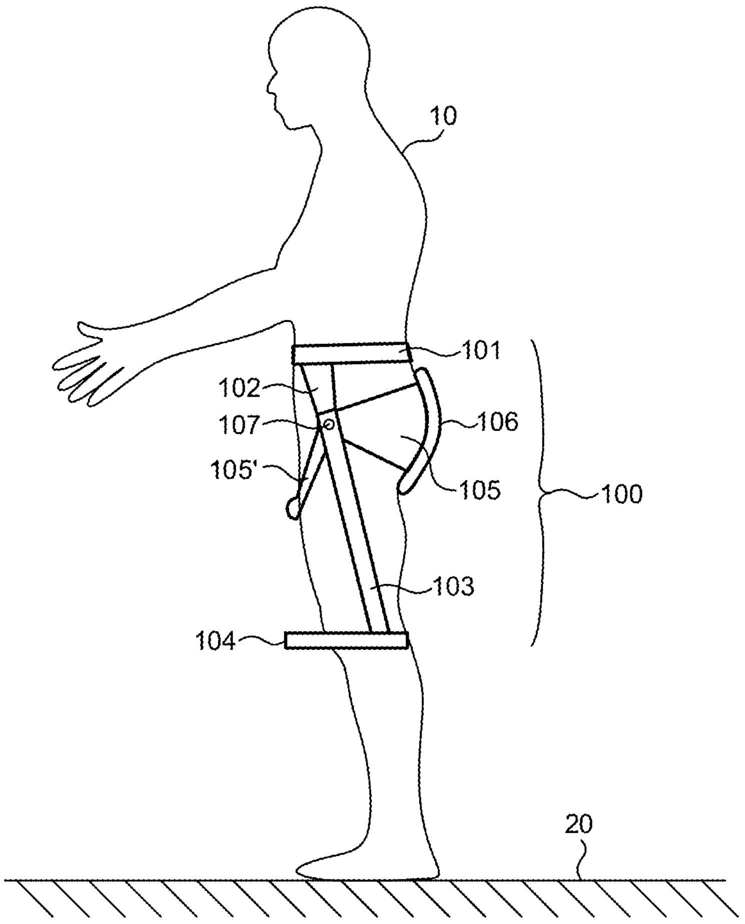
FIG. 1 depicts an illustration of a side view of a wearable lower body support system in one embodiment in a standing configuration.
Figure 2:
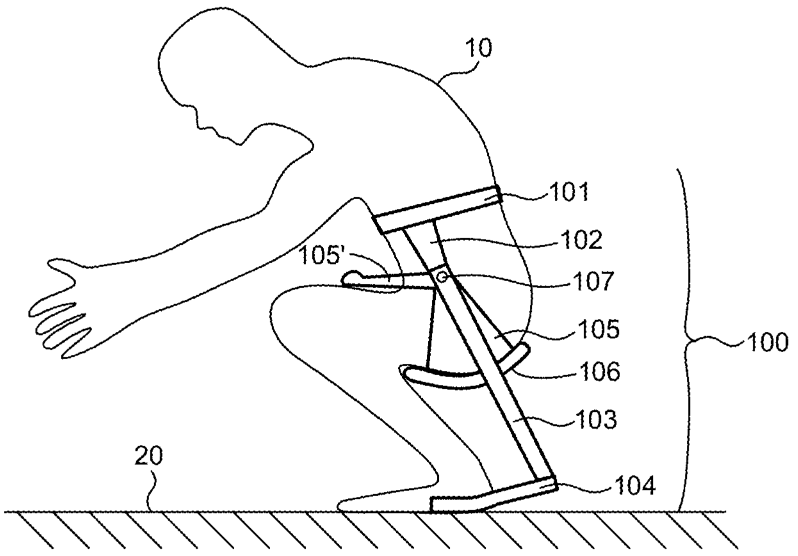
FIG. 2 depicts an illustration of a side view of the wearable lower body support system depicted in FIG. 1 in a crouched configuration.
Figure 3:
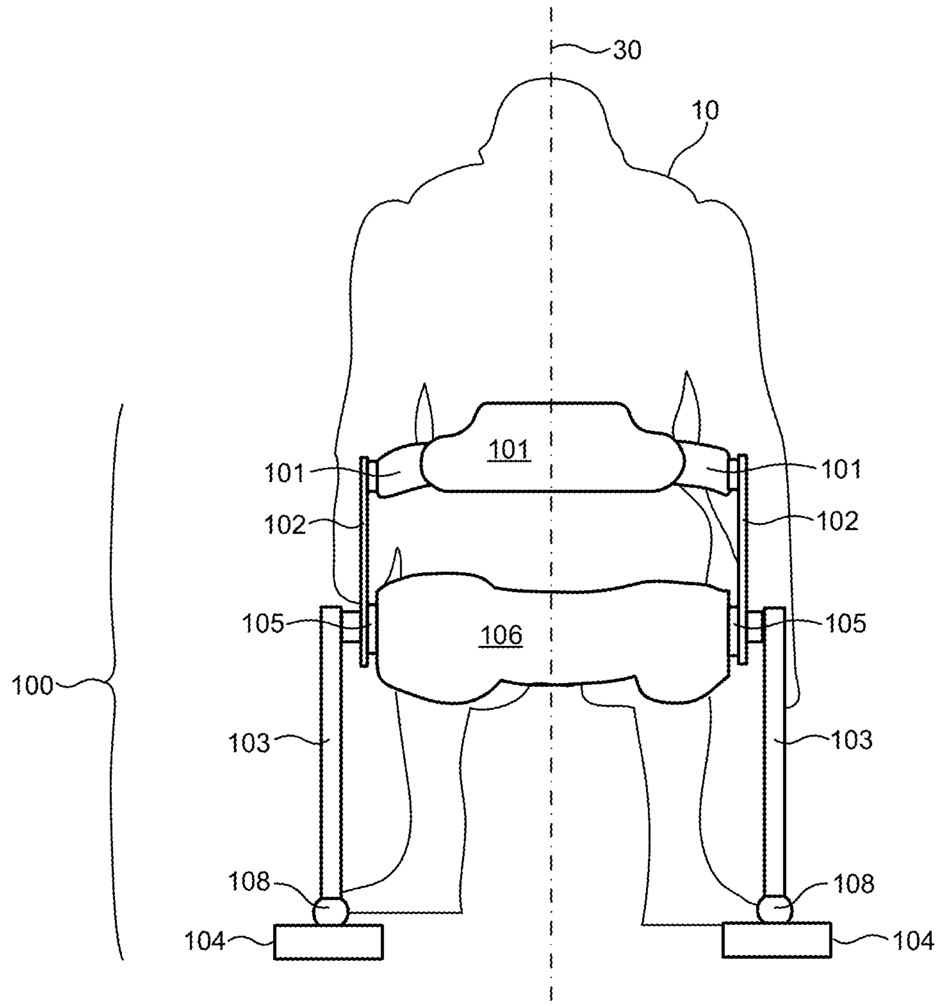
FIG. 3 depicts an illustration of a rear view of the wearable lower body support system depicted in FIG. 2 in a crouched configuration.

FIG. 1 depicts an illustration of a side view of wearable lower body support system 100 in one embodiment in a standing configuration. FIG. 2 depicts an illustration of a side view of the wearable lower body support system depicted in FIG. 1 in a crouched configuration. FIG. 3 depicts an illustration of a rear view of the wearable lower body support system depicted in FIG. 2 in a crouched configuration.

As depicted in FIGS. 1-3, wearable lower body support system 100 includes a removable harness assembly including a harness 101 (e.g., a padded belt or array of belts, etc.) wrapped around the lower torso of a human user 10 at or above the waist and support plate elements 102 fixedly attached to the harness 101. Harness 101 is removably attached to the lower torso of human user 10 using any suitable attachment mechanism (e.g., buckle fastener, hook and loop fastener, etc.). The support plate elements 102 are disposed on either side of the human user 10, e.g., on opposite sides of a sagittal plane. In addition, wearable lower body support system. 100 includes a seat support structure 106. In some embodiments, seat support structure 106 includes a structure that conforms to the seat of human user 10 and supports the seat of the human user 10 when the human user 10 is in a crouched position.

In addition, wearable lower body support system 100 includes passive lower body support assemblies disposed on either side of the human user 10, e.g., on opposite sides of a sagittal plane. Each passive lower body support assembly includes a primary body support structure 103 rigidly coupled to the harness assembly at support plate elements 102. Each primary body support structure 103 extends downward from the harness assembly toward a ground surface 20 of a working environment. In addition, each passive lower body support assembly includes a seat support frame 105 coupled to the seat support structure 106 and coupled to the support plate element 102 or the primary body support structure 103 at a rotational joint 107. Seat support frame 105 rotates with respect to the harness assembly about rotational joint 107. Each seat support frame 105 includes a lever arm portion 105' extending away from rotational joint 107. In some embodiments, lever arm portion 105' is attached to the upper thigh of human user 10 by a harness (not shown), e.g., buckle fastener, hook and loop fastener, etc. In some embodiments, lever arm portion 105' wraps around toward the front of the upper thigh of the human user.

As a human user moves from a standing position to a crouched position, the upper thigh of human user 10 causes seat support frame 105 to rotate about rotational joint 107 by interaction with lever arm portion 105'. For example, seat support frame 105 rotates about rotational joint 107 in a clockwise direction as viewed in FIG. 2 as the human user 10 moves from a standing position to a crouched position. The rotation of seat support frame 105 about rotational joint 107 causes seat support structure 106 to rotate from a location behind the seat of human user 10 to a location below the seat of human user 10. In this manner, seat support structure 106 is positioned to support the weight of human user 10 as human user 10 assumes a crouched position. As illustrated in FIGS. 1-3, the weight supported by seat support structure 106 is transmitted to the ground surface 20 via each seat support frame 105 and each primary body support structure 103 through rotational joint 107.

Conversely, as a human user moves from a crouched position to a standing position, the upper thigh of human user 10 causes seat support frame 105 to rotate about rotational joint 107 by interaction with lever arm portion 105'. For example, seat support frame 105 rotates about rotational joint 107 in a counter-clockwise direction as viewed in FIG. 2 as the human user 10 moves from a crouched position to a standing position. The rotation of seat support frame 105 about rotational joint 107 causes seat support structure 106 to rotate from a location below the seat of human user 10 to a location behind the seat of human user 10. In this manner, seat support structure 106 is positioned out of the way of human user 10, and human user 10 is able to walk about the work environment without being impeded by support structures located behind or in front of the legs of the human user 10. Furthermore, by locating the primary body support structures at the sides of the thighs of a human user 10 when standing and walking, the primary body support structures do not disturb the locomotion of a human user 10 and minimize collisions with surrounding objects.

By naturally driving the change of configuration of the wearable lower body support system 100 from an out of the way position when standing to a supportive position when crouching from the upper thigh of the human user 10, a human user 10 is able to focus on the task at hand without having to make explicit, manual adjustments to the wearable lower body support system as posture changes.

In general, seat support structure 106, harness 101, or both, are relatively rigid in a direction orthogonal to the sagittal plane 30. In other words, seat support structure 106, harness 101, or both, deform very little under load in a direction orthogonal to the sagittal plane 30. In this manner, passive lower body support assemblies at the point of attachment to support plate elements 102 are located in a relatively stable position relative the body of human user 10. In the embodiment illustrated in FIG. 3, support plates 102 have a relatively small dimension (i.e., thin) in a direction orthogonal to sagittal plane. In this manner, support plate elements 102 are able to conform to the shape of the body of human user 10 while maintaining high stiffness in directions parallel to the sagittal plane 30.

As viewed in the illustrations depicted in FIGS. 1 and 2, primary body support structures 103 extend in a direction approximately parallel to a spine of human user 10. Primary body support structures 103 extend below the spine of a human user 10 and come into contact with ground surface 20 without the seat of human user 10 coming into contact with ground surface 20. In this manner, primary body support structures 103 support the weight of human user 10 in a crouched position where the seat of human user 10 is above the ground surface 20.

In the embodiment depicted in FIGS. 1-3, each passive lower body support assembly of lower body support system 100 includes an end-effector structure 104 coupled to the primary body support structure 103 at an end of the primary body support structure 103 closest to the ground surface of the working environment. In this manner, end-effector structure 104 makes contact with ground surface 20 to support the weight of human user 10.

In some embodiments, end-effector structure 104 includes an elongated plate structure constructed from an elastic material that conforms to a shape of the ground surface when loaded by a weight of the human user as depicted in FIG. 2.

In some embodiments, end-effector structure 104 includes a disc shaped structure constructed from a polymer material, such as natural or synthetic rubber.

In some embodiments, the end-effector structure 104 is removeably removably coupled to the primary body support structure 103 with a quick-change coupler mechanism.

In some embodiments, end-effector structure 104 includes a swivel mechanism coupled between the primary body support structure and the end-effector. The swivel mechanism constrains the end-effector to rotate with respect to the primary body support structure about one or more axes of rotation to ensure the end-effector is in contact with the ground surface 20 over a maximum contact area. In addition, the swivel mechanisms coupled between the primary body support structures and the end-effectors enable a user to pitch side-to-side and forward and backward while being supported in a crouched position.

Figure 4:
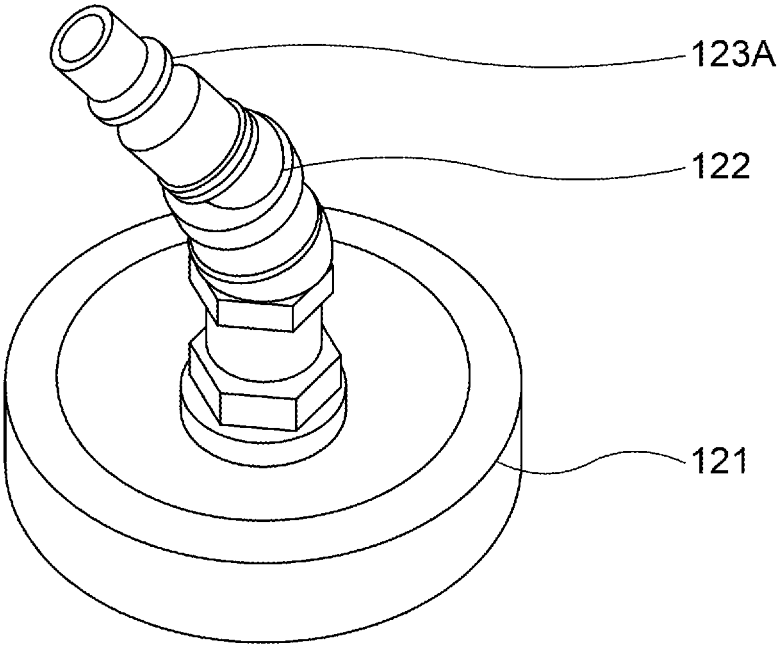
FIG. 4 depicts an illustration of an end-effector structure including a disc shaped end-effector constructed from natural rubber.

FIG. 4 depicts an illustration of an end-effector structure including a disc shaped end-effector 121 constructed from natural rubber. End-effector 121 is coupled to a swivel mechanism 122 that is, in turn, coupled to a portion 123A of a quick-change coupler.

Figure 5:
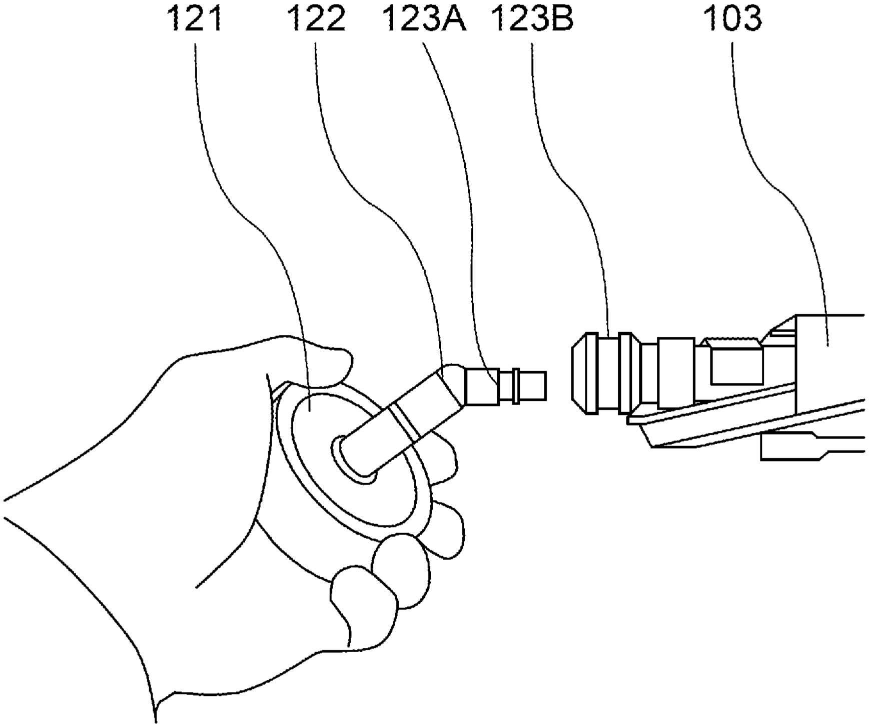
FIG. 5 depicts an illustration of the end-effector structure depicted in FIG. 4 being attached to a primary body support structure using a quick-change coupler.

FIG. 5 depicts an illustration of the end-effector structure depicted in FIG. 4 being attached to a primary body support structure 103 using a quick-change coupler 123. As depicted in FIG. 5, a portion 123A of the quick-change coupler attached to swivel 122 is matched to a portion 123B of the quick-change coupler attached to primary body support structure 103. The end-effector is removably coupled to the primary body support structure by the human user without tools using the quick-change coupler.

In a further aspect, each passive lower body support assembly includes an auxiliary body support structure to enhance the support of the human user in a crouched position.

Figure 6:
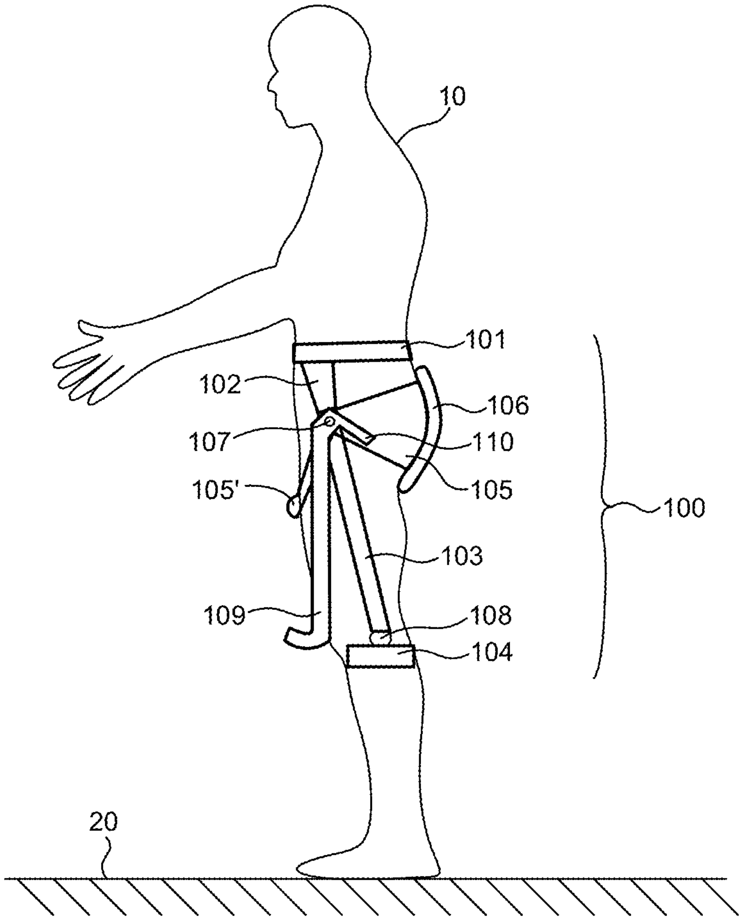
FIG. 6 depicts an illustration of a side view of a wearable lower body support system including an auxiliary body support structure in one embodiment in a standing configuration.
Figure 7:
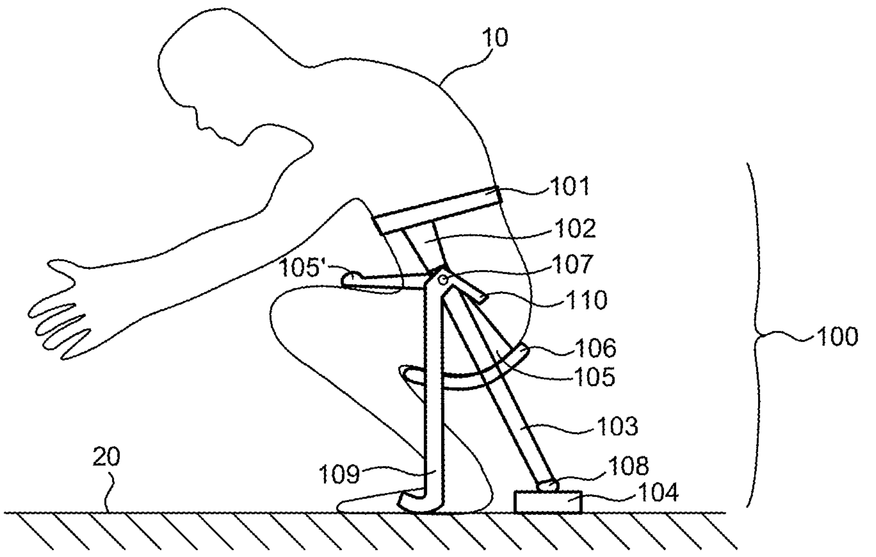
FIG. 7 depicts an illustration of a side view of the wearable lower body support system depicted in FIG. 6 in a crouched configuration.
Figure 8:
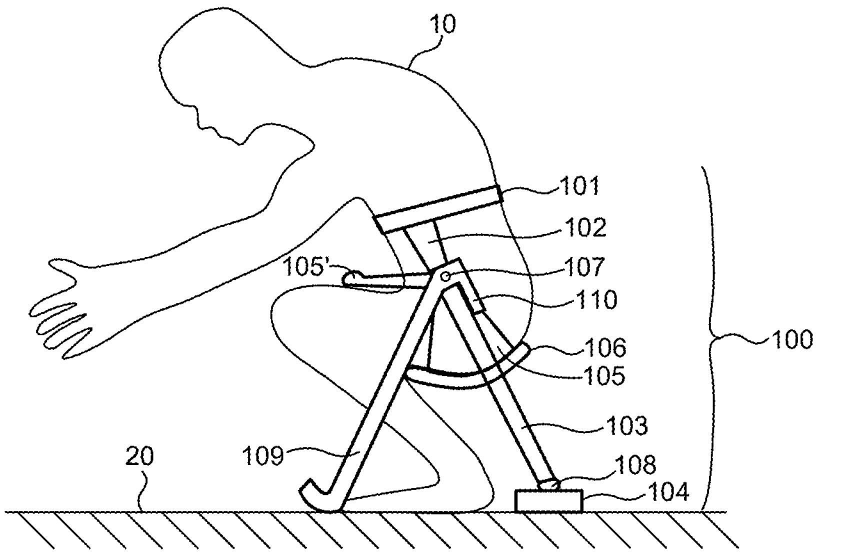
FIG. 8 depicts an illustration of a side view of the wearable lower body support system depicted in FIG. 6 in a crouched configuration with maximum separation between points of contact with the ground surface.

FIG. 6 depicts an illustration of a side view of wearable lower body support system 100 including an auxiliary body support structure in one embodiment in a standing configuration. FIG. 7 depicts an illustration of a side view of the wearable lower body support system depicted in FIG. 6 in a crouched configuration. FIG. 8 depicts an illustration of a side view of the wearable lower body support system depicted in FIG. 6 in a crouched configuration with maximum separation between points of contact with the ground surface by the auxiliary and primary body support structures.

As depicted in FIGS. 6-8, each passive lower body support assembly of wearable body support system 100 includes an auxiliary body support structure 109 extending downward from the harness assembly toward the ground surface 20 of the working environment. Auxiliary body support structure 109 is coupled to support plate element 102 of the harness assembly at rotational joint 107. In this manner, auxiliary body support structure 109 rotates with respect to the harness assembly about rotational joint 107. In some other embodiments, auxiliary body support structure 109 is coupled to support plate element 102 of the harness assembly at another rotational joint at a different location than rotational joint 107. In some other embodiments, auxiliary body support structure 109 is coupled to primary body support structure 103 at a rotational joint between auxiliary body support structure 109 and primary body support structure 103.

As a human user moves from a standing position to a crouched position, the upper thigh of human user 10 causes seat support frame 105 to rotate about rotational joint 107 by interaction with lever arm portion 105'. For example, seat support frame 105 rotates about rotational joint 107 in a clockwise direction as viewed in FIG. 7 as the human user 10 moves from a standing position to a crouched position. The rotation of seat support frame 105 about rotational joint 107 causes seat support structure 106 to rotate from a location behind the seat of human user 10 to a location below the seat of human user 10. In addition, auxiliary support structure 109 drops down and into contact with ground surface 20.

As depicted in FIG. 8, auxiliary support structure 109 slides along ground surface 20 until mechanical stop 110 of auxiliary support structure 109 comes into contact with primary body support structure 103. In this configuration, human user 10 is stably supported in four point contact with the ground as human user 10 assumes a crouched position. As illustrated in FIGS. 6-8, the weight supported by seat support structure 106 is transmitted to the ground surface 20 via each seat support frame 105 and each primary body support structure 103 and auxiliary body support structure 109 through rotational joint 107.

In another further aspect, each auxiliary body support structure is deployed in coordination with the rotation of seat support structure 106 to rotate from a location behind the seat of human user 10 to a location below the seat of human user 10.

Figure 9:
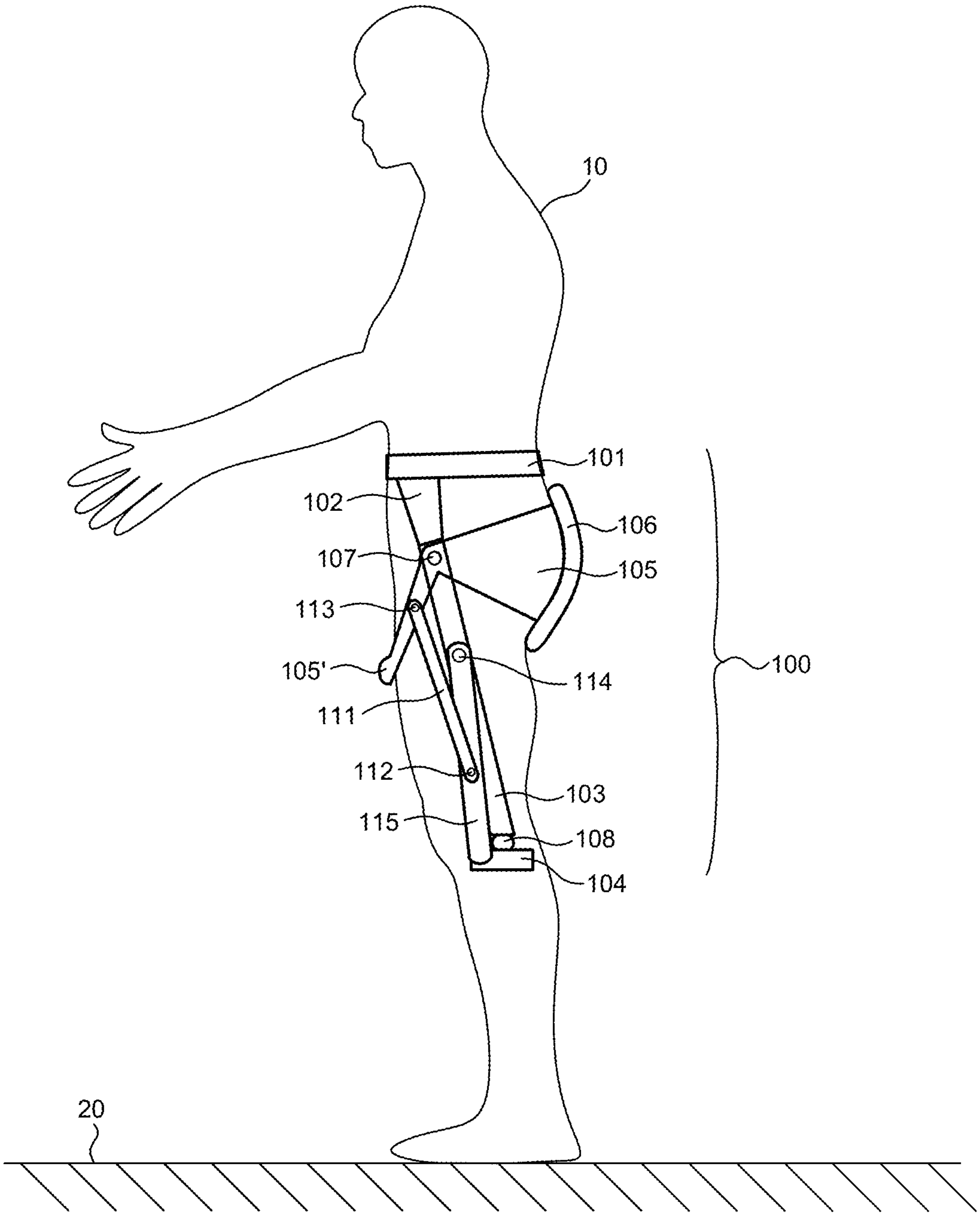
FIG. 9 depicts an illustration of a side view of a wearable lower body support system including an auxiliary body support structure in another embodiment in a standing configuration.
Figure 10:
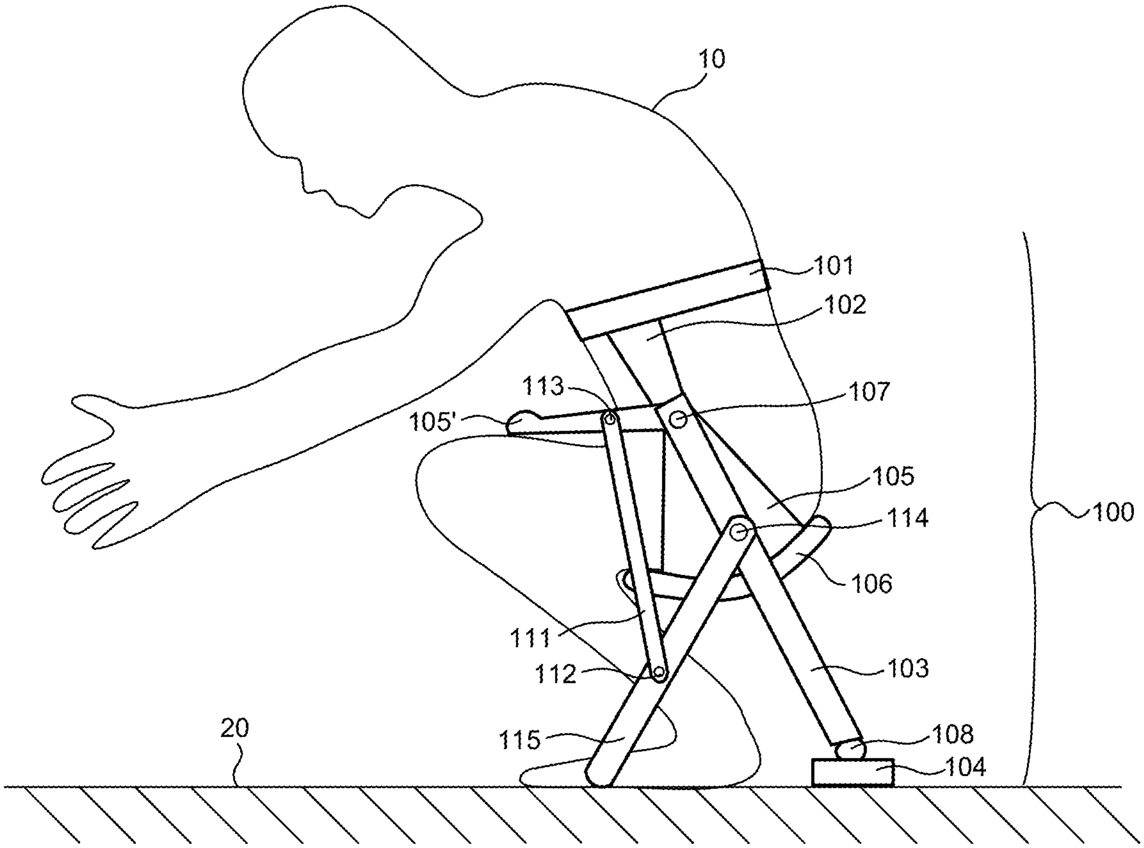
FIG. 10 depicts an illustration of a side view of the wearable lower body support system depicted in FIG. 9 in a crouched configuration.

FIG. 9 depicts an illustration of a side view of wearable lower body support system 100 including an auxiliary body support structure in another embodiment in a standing configuration. FIG. 10 depicts an illustration of a side view of the wearable lower body support system depicted in FIG. 9 in a crouched configuration.

As depicted in FIGS. 9-10, each passive lower body support assembly of wearable body support system 100 includes an auxiliary body support structure 115 extending downward from the harness assembly toward the ground surface 20 of the working environment. Auxiliary body support structure 115 is coupled to primary body support structure 103 at rotational joint 114. In this manner, auxiliary body support structure 115 rotates with respect to the primary body support structure 103 about rotational joint 114. In addition, auxiliary deployment link 111 is coupled to body support structure 115 at rotational joint 112 and seat support frame 105 at rotational joint 113. In this configuration seat support frame 105, primary body support structure 103, auxiliary body support structure 115, and auxiliary deployment link 111 form a four bar linkage mechanism.

As a human user moves from a standing position to a crouched position, the upper thigh of human user 10 causes seat support frame 105 to rotate about rotational joint 107 by interaction with lever arm portion 105'. For example, seat support frame 105 rotates about rotational joint 107 in a clockwise direction as viewed in FIG. 9 as the human user 10 moves from a standing position to a crouched position. The rotation of seat support frame 105 about rotational joint 107 causes seat support structure 106 to rotate from a location behind the seat of human user 10 to a location below the seat of human user 10. In addition, the rotation of seat support frame 105 about rotational joint 107 causes the four bar linkage to change configuration and deploy auxiliary support structure 115 (i.e., increase the angle between auxiliary body support structure 115 and primary body support structure 103) as auxiliary support structure 115 moves toward ground surface 20 as depicted in FIG. 10.

Conversely, as human user 10 moves from a crouched position to a standing position, the upper thigh of human user 10 causes seat support frame 105 to rotate about rotational joint 107 by interaction with lever arm portion 105'. For example, seat support frame 105 rotates about rotational joint 107 in a counter-clockwise direction as viewed in FIG. 10 as the human user 10 moves from a crouched position to a standing position. The rotation of seat support frame 105 about rotational joint 107 causes seat support structure 106 to rotate from a location below the seat of human user 10 to a location behind the seat of human user 10. In addition, the rotation of seat support frame 105 about rotational joint 107 causes the four bar linkage to change configuration and retract auxiliary support structure 115 (i.e., decrease the angle between auxiliary body support structure 115 and primary body support structure 103) as auxiliary support structure 115 moves away ground surface 20 as depicted in FIG. 9.

By naturally driving the change of configuration of the auxiliary support structure from an out of the way position when standing to a supportive position when crouching from the upper thigh of the human user 10, a human user 10 is able to focus on the task at hand without having to make explicit, manual adjustments to the auxiliary support structure as posture changes.

In another aspect, each primary body support structure is constructed from an elastic material that conforms to a shape of the ground surface when loaded by the weight of the human user.

Figure 11:
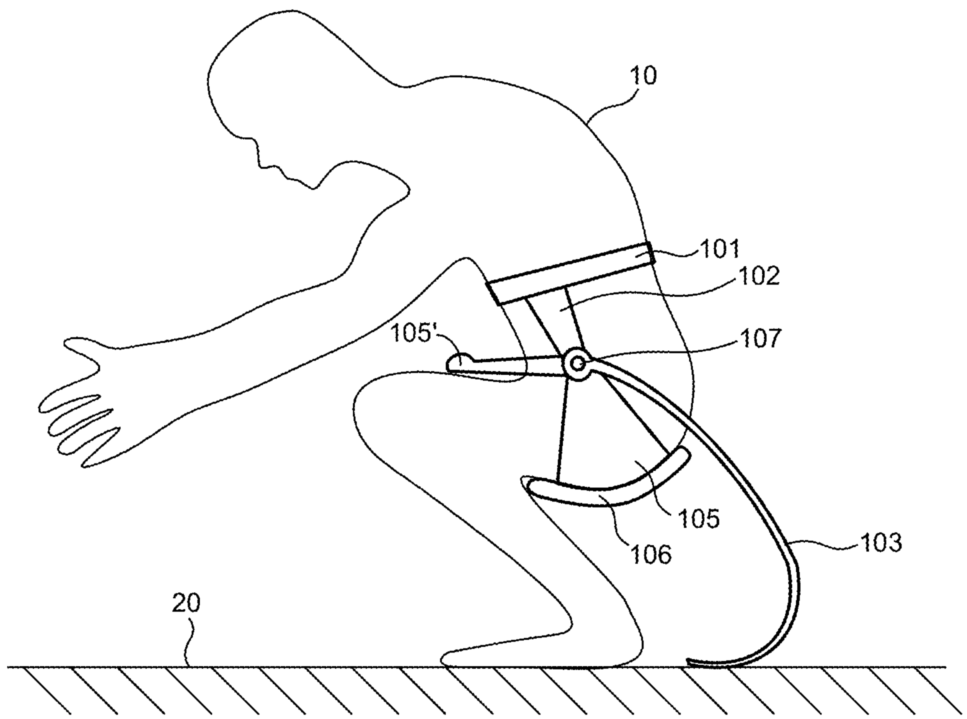
FIG. 11 depicts an illustration of a side view of a wearable lower body support system including a primary body support structure constructed from an elastic material that conforms to a shape of the ground surface when loaded by the weight of the human user.

FIG. 11 depicts an illustration of a side view of wearable lower body support system 100 including a primary body support structure constructed from an elastic material that conforms to a shape of the ground surface when loaded by the weight of the human user.

Primary body support structure 103 as depicted in FIG. 11 makes contact with the ground surface 20 and bends as the human user assumes a crouched posture and effectively loads the primary body support structure 103. Primary body support structure 103 is sufficiently compliant that a portion of the primary body support structure conforms to a shape of the ground surface when loaded by the weight of the human user and effectively creates a large contact area between the primary body support structure and the ground surface 20. Exemplary elastic materials include polymer based materials, metals, etc. formed in thin geometries that deform under bending stress to create a large contact area between the primary body support structure and the ground surface 20.

In another aspect, each passive lower body support assembly includes an auxiliary body support structure coupled to the primary body support structure at or near an end of the primary body support structure closest to the ground surface of the working environment to enhance the support of the human user in a crouched position.

Figure 12:
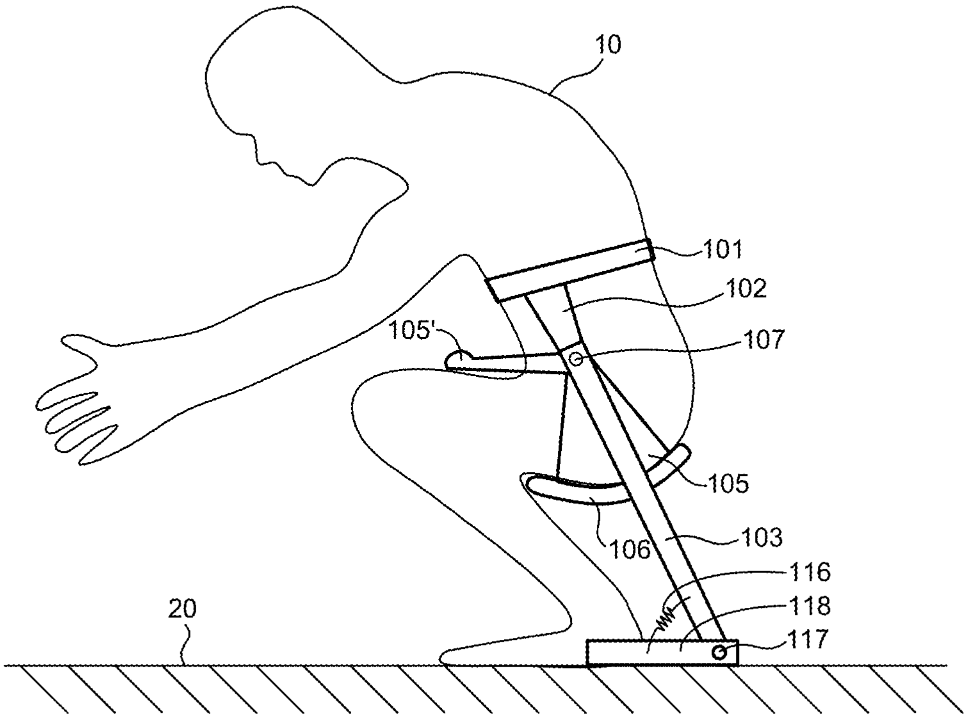
FIG. 12 depicts an illustration of a side view of wearable lower body support system 100 including an auxiliary body support structure coupled to the primary body support structure at or near an end of the primary body support structure closest to the ground surface of the working environment.

FIG. 12 depicts an illustration of a side view of wearable lower body support system 100 including an auxiliary body support structure coupled to the primary body support structure at or near an end of the primary body support structure closest to the ground surface of the working environment.

An auxiliary body support structure 118 is coupled to a primary body support structure 103 at a rotational joint 117 located at or near an end of the primary body support structure 103 closest to the ground surface 20 of the working, environment. In addition, a torsional spring 116 is coupled to the primary body support structure 103 and the auxiliary body support structure 118 such that a rotation of auxiliary body support structure 117 about rotational joint 117 generates a restoring force.

As depicted in FIG. 12, auxiliary body support structure 118 makes contact with the ground surface 20 and rotates with respect to primary body support structure 103 as the human user assumes a crouched posture and effectively loads the primary body support structure 103. Auxiliary body support structure 118 is sufficiently compliant that the auxiliary body support structure 118 conforms to a shape of the ground surface when loaded by the weight of the human user and effectively creates a large contact area between the auxiliary body support structure 118 and the ground surface 20. Exemplary elastic materials include polymer based materials, metals, etc. formed in thin geometries that deform under bending stress to create a large contact area between the auxiliary body support structure 118 and the ground surface 20.

In another aspect, each passive lower body support assembly includes an auxiliary body support structure coupled to the primary body support structure and constrained to translate with respect to the primary body support structure along a linear joint to enhance the comfort of the human user in a crouched position.

Figure 13:
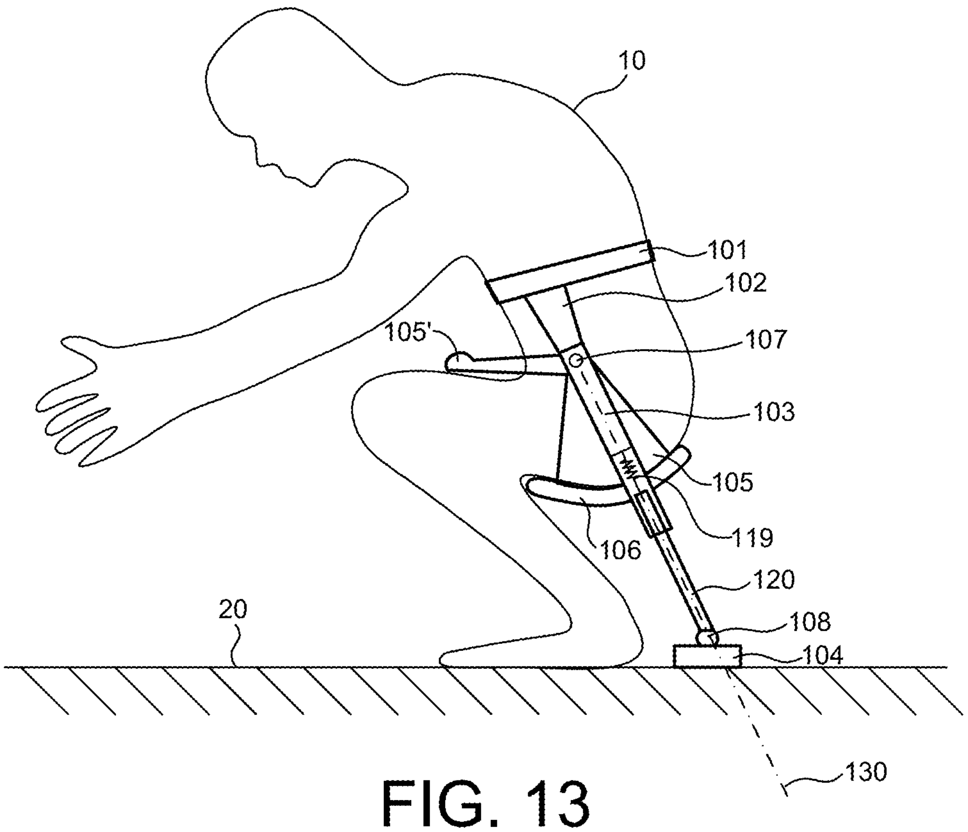
FIG. 13 depicts an illustration of a side view of a wearable lower body support system including an auxiliary body support structure coupled to the primary body support structure and constrained to translate with respect to the primary body support structure along a linear joint.

FIG. 13 depicts an illustration of a side view of wearable lower body support system 100 including an auxiliary body support structure 120 coupled to the primary body support structure 103 and constrained to translate with respect to the primary body support structure along a linear joint.

An auxiliary body support structure 120 is coupled to a primary body support structure 103 at a linear (i.e., translational) joint located at or near an end of the primary body support structure 103 closest to the ground surface 20 of the working environment. In addition, a linear spring 119 is coupled to the primary body support structure 103 and the auxiliary body support structure 120 such that a translation of auxiliary body support structure 120 with respect to the primary body support structure 103 along the linear joint axis 130 generates a restoring force.

As depicted in FIG. 13, auxiliary body support structure 120 makes contact with the ground surface 20 via end-effector 104 and translates with respect to primary body support structure 103 along linear joint axis 130 in a direction toward primary body support structure 103 as the human user assumes a crouched posture and effectively loads the primary body support structure 103. In this manner, the load bearing member including the primary and auxiliary body support structures is a compliant member that increases the comfort of the human user when loading and unloading the wearable lower body support system.

In general, each body support structure described herein may be configured as a compliant, two part structural member to increase the comfort of the human user when loading and unloading the wearable lower body support system.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A lower body support system, comprising:

a harness assembly configured to be removably attached to a torso of a human user;

a seat support structure; and a first passive lower body support assembly and a second passive lower body support assembly each including a primary body support structure rigidly coupled to the harness assembly, the primary body support structure extending downward from the harness assembly toward a ground surface of a working environment; and a seat support frame rigidly coupled to the seat support structure and coupled to the harness assembly or the primary body support structure at a rotational joint, the seat support frame rotatable with respect to the harness assembly about the rotational joint, wherein the first passive lower body support assembly is configured to be coupled to the harness assembly and the seat support structure on a first side of the torso of a human user and the second passive lower body support assembly is configured to be coupled to the harness assembly and the seat support structure on a second side of the torso of the human user opposite the first side.

2. The lower body support system of claim 1, wherein the first passive lower body support assembly and the second passive lower body support assembly each further includes an end-effector structure coupled to the primary body support structure at an end of the primary body support structure closest to the ground surface of the working environment.

3. The lower body support system of claim 2, wherein the end-effector structure includes an elongated plate structure constructed from an elastic material that conforms to a shape of the ground surface when loaded by a weight of the human user.

4. The lower body support system of claim 2, wherein the end-effector structure includes a disc shaped structure constructed from a polymer material.

5. The lower body support system of claim 2, wherein the end-effector structure is removably coupled to the primary body support structure, the end-effector structure including a quick-change coupler removably coupled to the primary body support structure, wherein the quick-change coupler is coupled to the primary body support structure and decoupled from the primary body support structure by the human user without tools.

6. The lower body support system of claim 5, wherein the end-effector structure includes an end-effector and a swivel mechanism coupled to the primary body support structure, the end-effector, or both, the swivel mechanism constraining the end-effector to rotate with respect to the primary body support structure about one or more axes of rotation.

7. The lower body support system of claim 1, wherein the first passive lower body support assembly and the second passive lower body support assembly each further includes an auxiliary body support structure coupled to the harness assembly or the primary body support structure at a second rotational joint, the auxiliary body support structure extending downward from the harness assembly toward the ground surface of the working environment.

8. The lower body support system of claim 7, wherein the first rotational joint and the second rotational joint are the same rotational joint.

9. The lower body support system of claim 1, wherein the first passive lower body support assembly and the second passive lower body support assembly each further includes
an auxiliary body support structure coupled to the primary body support structure at a second rotational joint, the auxiliary body support structure extending downward from the primary body support structure toward the ground surface of the working environment; and
a link structure coupled to the auxiliary body support structure at a third rotational joint and the seat support frame at a fourth rotational joint.

10. The lower body support system of claim 1, wherein the primary body support structure is constructed from an elastic material that conforms to a shape of the ground surface when loaded by a weight of the human user.

11. The lower body support system of claim 1, wherein the first passive lower body support assembly and the second passive lower body support assembly each further includes
an auxiliary body support structure coupled to the primary body support structure at a second rotational joint located at or near an end of the primary body support structure closest to the ground surface of the working environment; and
a torsional spring coupled to the primary body support structure and the auxiliary body support structure.

12. The lower body support system of claim 1, wherein the first passive lower body support assembly and the second passive lower body support assembly each further includes
an auxiliary body support structure coupled to the primary body support structure and constrained to translate with respect to the primary body support structure along a linear joint; and
a spring coupled to the primary body support structure and the auxiliary body support structure, wherein a force between the primary body support structure and the auxiliary body support structure is induced by a relative displacement of the auxiliary body support structure with respect of the primary body support structure along the linear joint.

13. A wearable lower body support system, comprising:
a harness assembly configured to be removably attached to a torso of a human user;
a first passive lower body support assembly and a second passive lower body support assembly each including
a primary body support structure rigidly coupled to the harness assembly, the primary body support structure extending downward from the harness assembly toward a around surface of a working environment; and
a seat support frame coupled to the harness assembly or the primary body support structure at a rotational joint, the seat support frame rotatable with respect to the harness assembly about the rotational joint; and
a seat support structure rigidly coupled to the seat support frame of the first passive lower body support assembly and the seat support frame of the second passive lower body support assembly, wherein the seat support structure is configured to be movable from a location behind a seat of the human user to a location below the seat of the human user as the seat support frame rotates about the rotational joint of the first passive lower body support assembly and the seat support frame rotates about the rotational joint of the second passive lower body support assembly.

14. The wearable lower body support system of claim 13, wherein one or both of the seat support frames include a lever arm portion of the seat support frame configured to be in contact with an upper thigh of the human user, and wherein a movement of the human user from a standing position to a crouched position causes the seat support frame to rotate about the rotational joint of the first passive lower body support assembly and to rotate about the rotational joint of the second passive lower body support assembly.

15. The wearable lower body support system of claim 14, wherein the lever arm portion of the one or both seat support frames is configured to be coupled to the upper thigh of the human user by a second harness assembly.

16. The wearable lower body support system of claim 13, wherein the first passive lower body support assembly is configured to be coupled to the harness assembly and the seat support structure on a first side of the torso of the human user and the second passive lower body support assembly is configured to be coupled to the harness assembly and the seat support structure on a second side of the torso of the human user opposite the first side.

17. A wearable lower body support system, comprising:
a harness assembly configured to be removably attached to a torso of a human user;
a seat support structure;
a first passive lower body support assembly including
a first primary body support structure rigidly coupled to the harness assembly, the first primary body support structure extending downward from the harness assembly toward a ground surface of a working environment; and
a first seat support frame rigidly coupled to the seat support structure and coupled to the harness assembly or the first primary body support structure at a first rotational joint, the first seat support frame rotatable with respect to the harness assembly about the first rotational joint; and
a second passive lower body support assembly including
a second primary body support structure rigidly coupled to the harness assembly, the second primary body support structure extending downward from the harness assembly toward a around surface of a working environment; and
a second seat support frame rigidly coupled to the seat support structure and coupled to the harness assembly or the second primary body support structure at a second rotational joint, the second seat support frame rotatable with respect to the harness assembly about the second rotational joint, wherein the seat support structure is configured to be movable from a location behind a seat of the human user to a location below the seat of the human user as the first seat support frame rotates about the first rotational joint and the second seat support frame rotates about the second rotational joint.

18. The wearable lower body support system of claim 17, wherein the first seat support frame includes a lever arm portion of the seat support frame configured to be in contact with an upper thigh of the human user, and wherein a movement of the human user from a standing position to a crouched position causes the first seat support frame to rotate about the first rotational joint and the second seat support frame to rotate about the second rotational joint.

19. The wearable lower body support system of claim 18, wherein the lever arm portion of the first seat support frame is configured to be coupled to the upper thigh of the human user by a second harness assembly.

20. The wearable lower body support system of claim 17, wherein the first passive lower body support assembly is configured to be coupled to the harness assembly and the seat support structure on a first side of the torso of the human user and the second passive lower body support assembly is configured to be coupled to the harness assembly and the seat support structure on a second side of the torso of the human user opposite the first side.

* * * * *